(12) United States Patent
Bercher et al.

(10) Patent No.: US 7,135,984 B2
(45) Date of Patent: Nov. 14, 2006

(54) DEVICE FOR POSITIONING A WORKPIECE

(75) Inventors: Heinrich Bercher, Constance (DE);
Luigi Naturale, Constance (DE);
Wolfgang Huch, Mainz-Laubenheim (DE)

(73) Assignee: Fertigungstechnik Weissenfels GmbH (DE)

( * ) Notice: Subject to any disclaimer, the term of this patent is extended or adjusted under 35 U.S.C. 154(b) by 135 days.

(21) Appl. No.: 10/959,727

(22) Filed: Oct. 6, 2004

(65) Prior Publication Data
US 2005/0078012 A1    Apr. 14, 2005

(30) Foreign Application Priority Data
Oct. 9, 2003    (DE) ................................ 103 47 612

(51) Int. Cl.
*G08B 21/00* (2006.01)
(52) U.S. Cl. ................... 340/686.5; 340/679; 340/680; 340/686.3; 340/825.23
(58) Field of Classification Search ............ 340/686.5, 340/825.23, 10.3, 5.1, 5.26, 5.61, 679, 680, 340/686.2, 686.3, 686.4, 691.7, 693.3; 375/239, 375/353; 714/746, 786
See application file for complete search history.

(56) References Cited

U.S. PATENT DOCUMENTS

| 5,588,195 A | 12/1996 | Asai et al. |
| 5,759,085 A * | 6/1998 | Gugenheimer et al. ........ 451/8 |
| 5,770,936 A | 6/1998 | Hirai et al. |
| 5,814,900 A | 9/1998 | Esser et al. |
| 6,047,535 A | 4/2000 | Schroers et al. |
| 6,101,084 A | 8/2000 | Rakov |
| 6,371,417 B1 * | 4/2002 | Southon ..................... 246/247 |

FOREIGN PATENT DOCUMENTS

| DE | 3816135 A1 | 11/1989 |
| DE | 4201013 A1 | 7/1993 |
| DE | 19651232 C1 | 5/1998 |

* cited by examiner

*Primary Examiner*—Daniel Wu
*Assistant Examiner*—Daniel Previl
(74) *Attorney, Agent, or Firm*—McGlew & Tuttle, PC

(57) ABSTRACT

A device for positioning a workpiece for machining has a bench, which is mounted movably at a base and to which the workpiece (14) can be fastened. A detection device (15, 16, 17, 18) is arranged at the bench (12) for detecting a state of a machining process of the workpiece (14) and for generating detected information depending thereon. An energy transmission device (38, 42, 49, 50), for transmitting electric energy to the components (16, 17, 18, 21), is arranged on the bench (12). An information transmission device (39, 40, 43, 44, 59, 60) for transmitting detected information of the detection device (15, 16, 17, 18) to a control (63) is associated with the base (11). The energy transmission device (38, 42, 49, 50) transmits the energy and the information transmission device (39, 40, 43, 44, 59, 60) transmits the information inductively and/or capacitively via the same air gap. An additional detection device (54) detects a state of energy transmission and generates additional detected information depending thereon. The additional detected information is transmitted as feedback information to the control (63) for correcting disturbances and/or changes in the energy transmission device (38, 42, 49, 50) and/or of the information transmission device (39, 40, 43, 44, 59, 60).

15 Claims, 5 Drawing Sheets

DEVICE FOR POSITIONING A WORKPIECE

CROSS REFERENCE TO RELATED APPLICATIONS

This application claims the benefit of priority under 35 U.S.C. § 119 of DE 103 47 612.1 filed Oct. 11, 2003, the entire contents of which are incorporated herein by reference.

FIELD OF THE INVENTION

The present invention pertains to a device for positioning a workpiece for machining, with a bench, which is mounted movably on a base and to which the workpiece can be fastened, with detection means arranged at the bench for detecting a state of a machining process of the workpiece and for generating detected information depending thereon, with energy transmission means for transmitting electric energy to components arranged on the bench, and with information transmission means for transmitting detected information of the detection means to a control associated with the base.

BACKGROUND OF THE INVENTION

During the automated machining of workpieces, these workpieces are fastened mostly on pallets and then fed to different clamping or rotary tables for the further machining. Movement of the bench relative to a stationary base is often necessary. Since a plurality of sensors, for example, inductive proximity switches, pressure sensors, temperature sensors or similar means are frequently arranged on the pallet, and since, moreover, actuators are frequently also necessary on the pallet, it is necessary to supply the components arranged on the pallets with energy, on the one hand, and, on the other hand, to transmit the information from the sensors to a central control for controlling the machining. So-called slip ring contacts are used for this purpose in most cases. These slip ring contacts have the drawback that they are subject to wear and are, in particular, readily contaminated during the machining operation. This contamination or wear may lead to disturbances and errors and even to complete failure. On the whole, the use of slip ring contacts is very maintenance-intensive. Contactless methods are sometimes also used to transmit the energy or the information. For example, optical signal transmission by means of optical light guides and infrared radiation is used. The drawback of this method is that the optical light guides of the two parts moving in relation to one another must be precisely adjusted in order for error-free transmission to be possible. In contrast, changes in the air gap between moving parts can greatly affect the quality of the signal transmission in the case of inductive signal transmission. Erroneous information may be transmitted, in particular, in case of contamination or a change of the air gap.

SUMMARY OF THE INVENTION

The basic object of the present invention is to guarantee the transmission of energy to a mobile work bench as well as the transmission of information from the work bench to a control in a simple manner, extensively without wear and possibly error-free.

The object is accomplished such that the energy transmission means and the information transmission means transmit the energy and the information in a device of the type described in the introduction inductively and/or capacitively via the same air gap; that additional detection means are provided for detecting an energy transmission state and for generating additional detected information depending thereon, and that the additional detected information is transmitted to the control as feedback information for correcting disturbances and/or changes in the energy transmission means and/or the information transmission means.

The transmission of the energy as well as of the information via the same air gaps makes it possible, on the one hand, to arrange the energy transmission means and the information transmission means in the same transmission head. This results in a simple design with a small number of individual components. Since, furthermore, the information is transmitted via the same air gap as the energy, the detection of an energy transmission state, for example, of the transmitted voltage or of the power consumed, yields information on the state of the air gap in a simple manner. This information can be used as feedback information in a simple and efficient manner to correct disturbances in the information transmission. For example, a supply voltage of 24 V can thus be guaranteed in a stable manner.

A common transmission head is preferably provided for the energy transmission means and the information transmission means. This results in a simple design. High resistance to contamination is achieved especially if this transmission head is encapsulated. The transmission head may have a core, on which an energy transmission coil and an information transmission coil with mutually different magnetic field orientations are arranged. The fields for the energy transmission and for the information transmission can thus be extensively separated from one another.

In a variant, the additional detection means are associated with the bench and they detect a transmitted voltage. This voltage is generated by transmitting energy inductively via the air gap. As an alternative or in addition, the additional detection means may be associated with the base and detect a current or a power consumption of a supply device for the energy transmission means. Since the primary current and the power consumption of this supply device also depend on the state of the air gap, the detection of the current or of the power consumption of this supply device also provides good information on the state of the air gap. It is also possible for the additional detection means to detect the temperature of an electric circuit associated with the bench or the base. This information on the temperature of the electric circuit may also be suitable for feedback. For example, internal protocols may be set up here. Signals of an additional sensor can be used for the process control.

Another variant of the present invention is characterized in that a control unit of an energy supply for the components arranged on the bench is performed by controlling a frequency of the voltage fed to the energy transmission means. This control may be performed, for example, by means of pulse width modulation. Since the energy is transmitted here similarly to the transmission by means of a transformer, the energy supply can be controlled simply and reliably by frequency control.

The information transmission is preferably performed digitally. In particular, the use of a binary code is advantageous. This digital transmission is, in particular, not prone to disturbances if frequency coding of the digital values and/or of the binary values is performed. Discrete voltage levels are not to be detected in this case. It is rather sufficient for the demodulation to recognize individual frequencies. In addition, it is advantageous if the frequency assignment is selectable. This selection may be carried out especially by means of so-called jumpers. The frequency assignments used can be selected in this case depending on the ambient conditions such that the most error-free transmission possible is achieved.

In a variant, demodulating means, which have logical units for the decoding, are provided for decoding the transmitted information. The individual transmitted values can thus be recognized in a simple manner by comparison with a reference frequency by the logical units and the transmitted information can thus be demodulated especially in the embodiment in which frequency coding of the digital values and/or of the binary values is performed.

One variant of the present invention is characterized in that bidirectional information transmission means are provided. These bidirectional transmission means make possible, on the one hand, the detection of measured values that correspond to the machining process. However, it is also possible, on the other hand, to transmit control signals to the components on the bench for machining the workpieces, for example, to actuators arranged there.

A transmission head for radial coupling or axial coupling may be used in the device according to the present invention. Lower scatter field losses occur in case of the axial couplings than with the radial coupling. However, the radial coupling makes it possible to arrange at least one transmission head of a pair of transmission heads forming a transmission section outside a pivot axis necessary for rotating the bench. In addition, it is advantageous if the decoding is performed by means of phase detection.

One variant of the present invention is characterized by a carrier that can be fastened to the bench for receiving the workpiece, the detection means and/or the components, wherein the energy transmission means and/or the information transmission means also transmit the energy and/or the information inductively and/or capacitively between the bench and the carrier. The workpiece and the necessary sensors or actuators may be fastened to the carrier in this case, the carrier being placed on the bench for the machining. So-called pallets are frequently used as carriers. The replacement of the pallets is usually performed in a fully automated manner. Since energy transmission and information transmission take place reliably in this case because of the energy transmission means and information transmission means having the features of the present invention without plug-type and sliding contacts being necessary for this purpose, and without the possibility of errors in transmission because of erroneous adjustment or contamination or wear, good machining results can thus be achieved in the long term at a high speed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
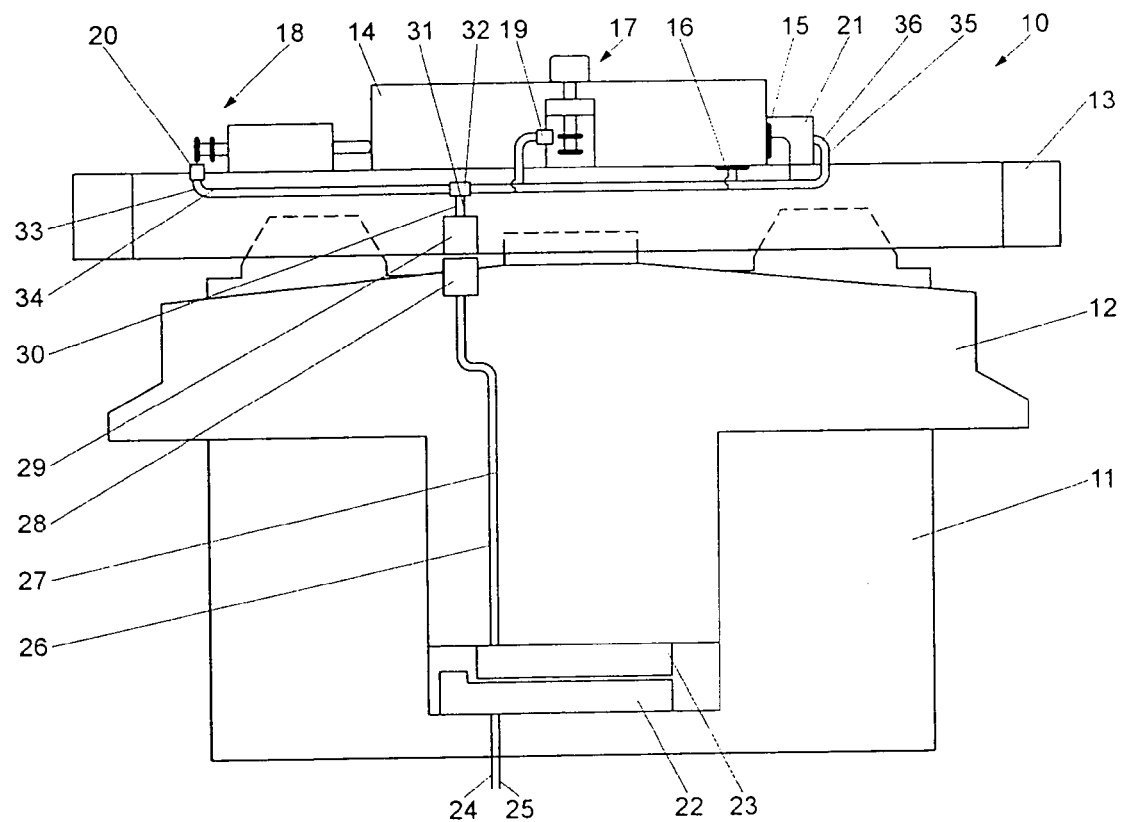
FIG. 1 is a schematic view of a rotary table with the features of the present invention.

FIG. 1 shows a schematic view of a device for positioning a workpiece for machining. A rotary table 10 with a stationary base 11, at which a bench 12 is arranged pivotably or rotatably around an axis A, is shown. A carrier 13 is fastened to the bench 12. The carrier 13 is a so-called pallet 13, which is fastened to the bench 12 in the known manner.

A workpiece 14 is arranged for machining on the side of the pallet 13 facing away from the bench 12. In addition, a plurality of sensors 15, 16, 17, 18 are arranged on the side of the pallet 13 facing away from the bench 12. The sensor 15 is a temperature sensor 15 for determining the temperature of the workpiece 14. The sensor 16 is a pressure sensor 16 for determining the weight or the pressing force on the workpiece 14. The sensor 17 is a height sensor 17 for determining the height of the upper surface of the workpiece 14 and thus the thickness of the workpiece 14. The sensor 18 is a position sensor 18 for determining the position of the workpiece 14 on the pallet 13. The height sensor 17 and the position sensor 18 have each inductive proximity switches 19, 20. In addition, an actuator 21, which is used to affect the workpiece 14, is schematically shown in the figure on the side of the pallet 13 facing away from the bench 12. The actuator 21 may be, for example, a heater for heating the workpiece 14 or a bracing device for applying a clamping force on the workpiece 14.

As can be determined from FIG. 1, two transmission heads 22, 23 are arranged facing each other between the base 11 and the bench 12 in the area of the pivot axis A. The transmission head 22 is connected with a line 24 and a line 25. Only a line 24 and a line 25 are shown here for the sake of greater clarity. However, at least one feed line and a return line are usually provided here instead of the line 24, and likewise at least one feed line and a return line are provided instead of the line 25. The line 24 is used to supply the components arranged on the pallet 13 with energy and is connected at its other end to a d.c. voltage source, not shown in the figure. The line 25 is used to send and receive information and is connected at its end facing away from the transmission head 22 to a modulator/demodulator unit, not shown in the figure. The transmission head 23 is connected to a transmission head 28 via two lines 26, 27 corresponding to the lines 24, 25. The transmission head 28 faces a transmission head 29, which is arranged on the side of the pallet 13 facing away from the workpiece 14. The transmission head 29 is connected with a modulator/demodulator unit 32 by means of lines 30, 31. The modulator/demodulator unit 32 is connected with the proximity sensor 20 by means of the lines 33, 34 and with the pressure sensor 16 and with the proximity sensor 19 by means of the lines 35, 36. In addition, the modulator/demodulator unit 32 is connected with the actuator 21 by means of the lines 35, 36 and with the temperature sensor 15 by means of the line 36.

Figure 2:
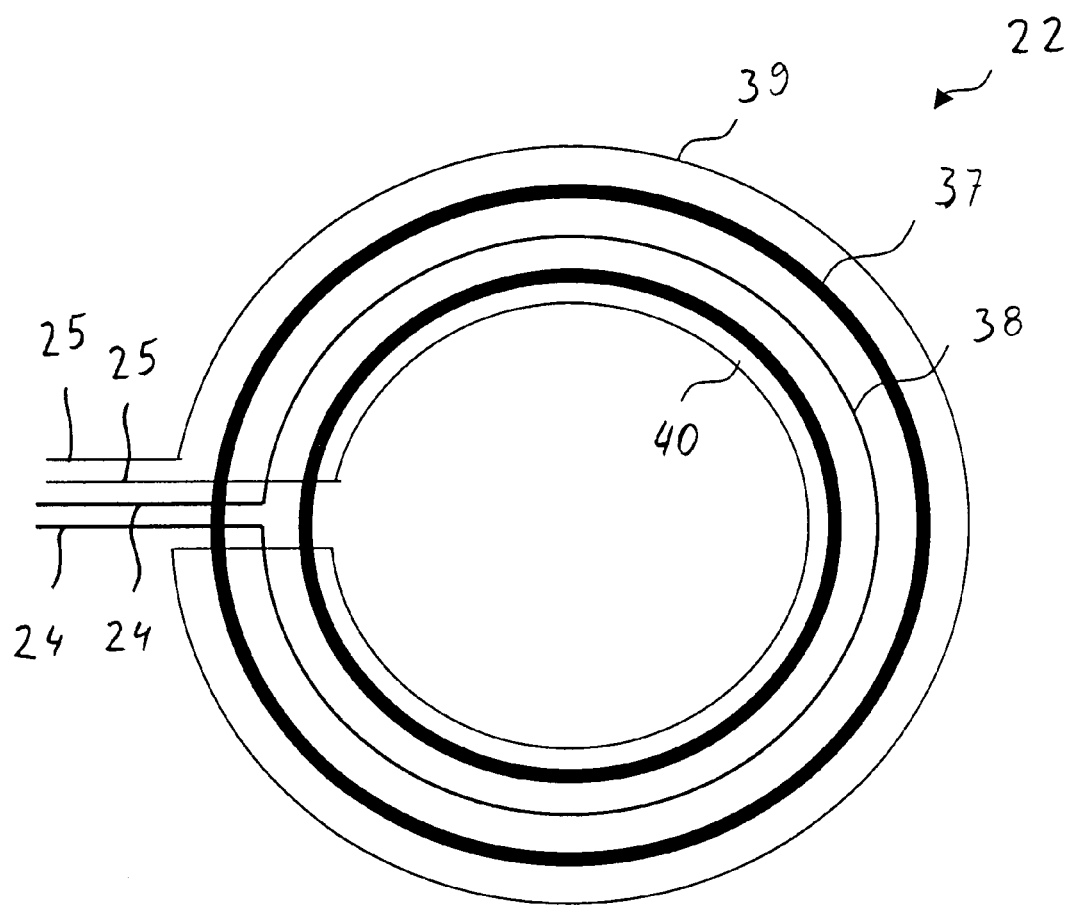
FIG. 2 is a schematic view of a transmission head according to FIG. 1.

FIG. 2 schematically shows the design of the transmission head 22. As can be determined from the figure, the transmission head 22 has a core 37, on which a coil 38 and a coil 39, 40 are wound. The coil 38 is wound in the sink between the edges of the toroidal core 37 and is connected with the lines 24. With an outer winding 39 connected with a line 25, the coil 39, 40 leads at first around the toroidal core 37, then changes over to the inner side of the toroidal core 37 and leads with an inner winding 40 back again in the opposite direction. The winding 40 is connected with the winding 39 at one end and with a line 25 at the other end.

Figure 3:
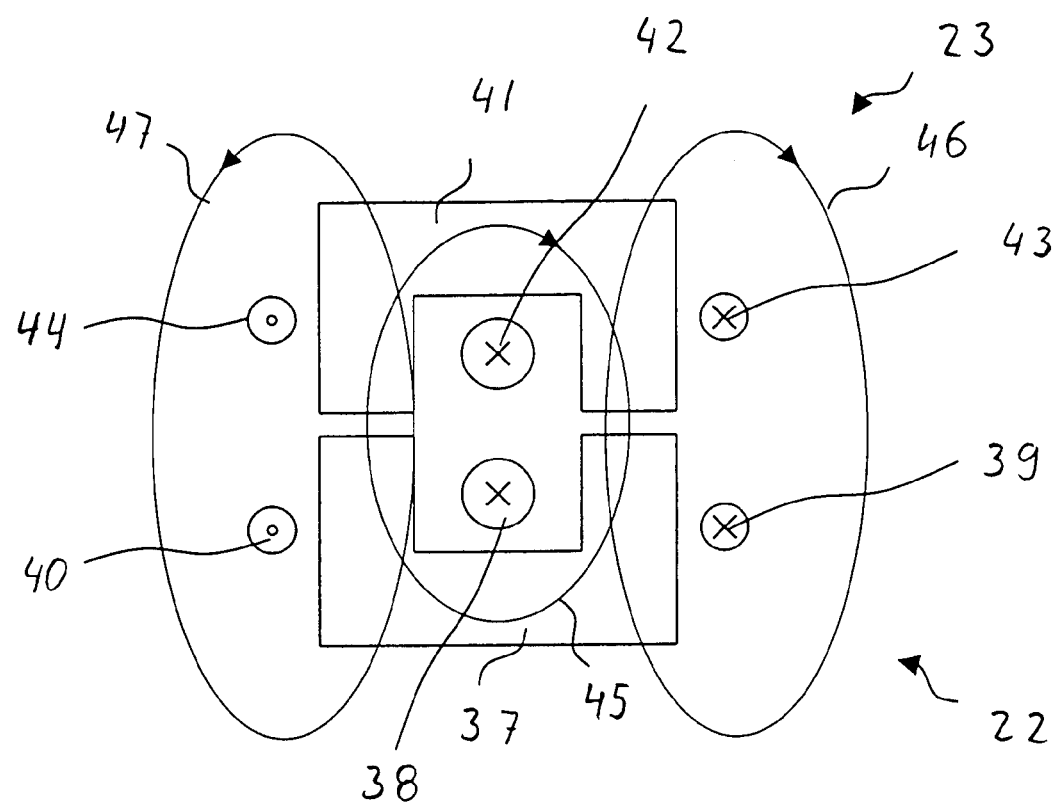
FIG. 3 is a section through two transmission heads facing one another.

FIG. 3 shows a section through an edge area of the transmission head 22 and an edge area of the transmission head 23 associated with same. The design of the transmission head 23 corresponds to that of the transmission head 22 and has a toroidal core 41, a coil 42 and a coil 43, 44 with an outer winding 43 and with an inner winding 44. As can be determined from FIG. 3, the fields of the coils 38, 42 and of the coils 39 and 43 as well as 40 and 44 are extensively separated from one another in the manner described. The magnetic field 45 generated by the coil 38 encloses the coil 42 and induces a desired voltage there for the energy supply. The figure shows a snapshot of a state of the particular alternating currents through the coils 38, 42 and 39, 43 and 40, 44. The magnetic field 46 generated by the outer winding 39 encloses the outer winding 43. The magnetic field 47 generated by the inner winding 40 in the direction opposite the direction of the magnetic field 46 encloses, in contrast, the inner winding 44. The fields 46, 47 for the information transmission can thus be extensively separated from the field 45 used for the energy transmission.

Figure 4:
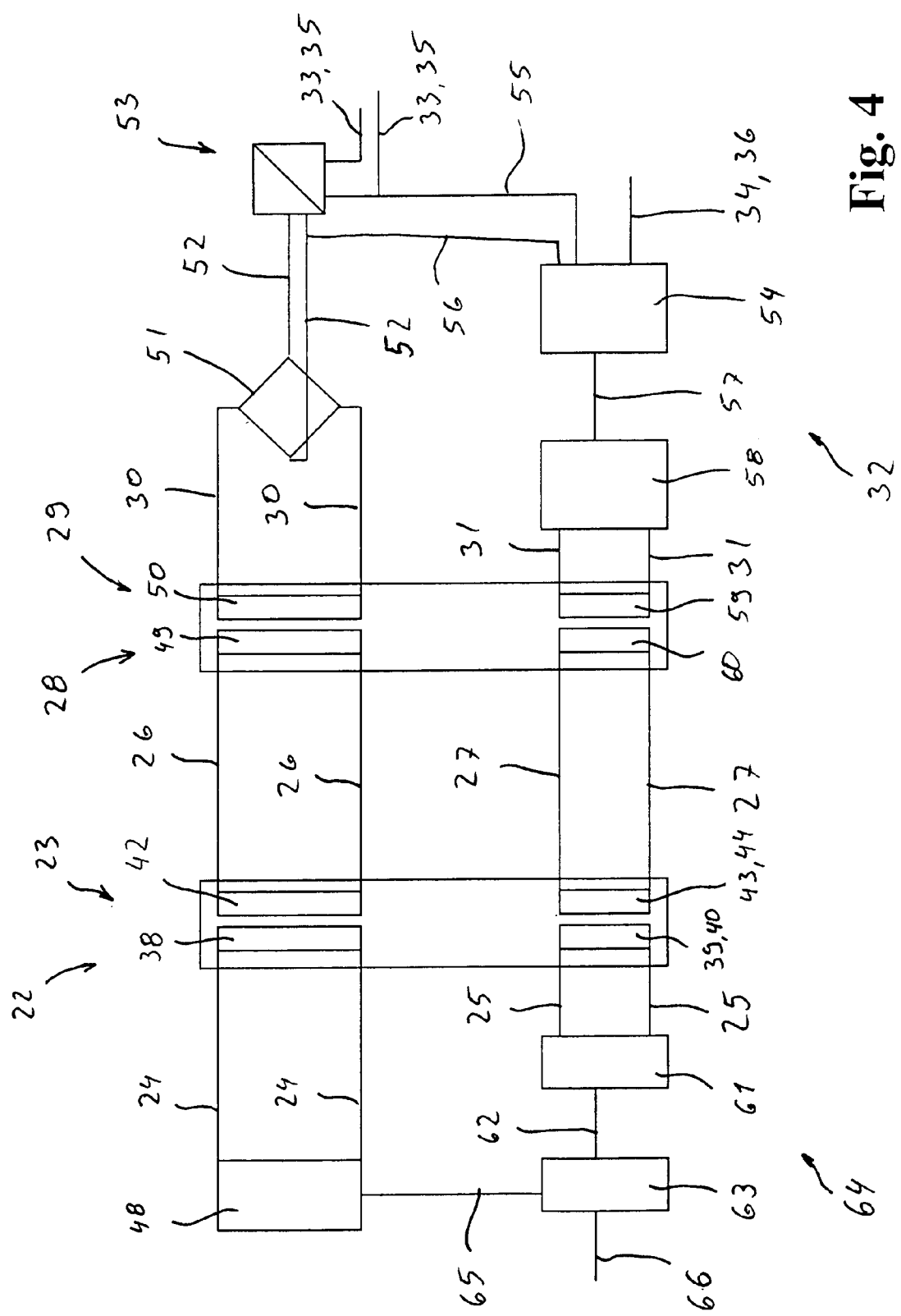
FIG. 4 is a block diagram of the transmission device according to FIG. 1.

FIG. 4 shows a block diagram of the device for the energy supply and for the information transmission with the features of the present invention. Identical elements are designated by the same reference numbers as in FIGS. 1 through 3. As can be determined from FIG. 4, an a.c. voltage source 48 is connected with the coil 38 of the transmission head 22 by means of two lines 24. A coil 42 of the transmission head 23 is associated with the coil 38 and connected with the coil 49 of the transmission head 28 by means of the lines 26. A coil 50 of the transmission head 29, which is in turn connected with a prior-art rectifier circuit 51, is associated with the coil 49. The rectifier circuit 51 may be, for example, a prior-art rectifier circuit by means of diodes and is in turn connected with a voltage transformer 53 by means of lines 52. A DC—DC voltage transformer 53 is provided as the voltage transformer in the exemplary embodiment being shown. The DC—DC voltage transformer 53 is connected with the sensors 15, 16, 17, 18 and the actuator 21, which are not shown in the figure, by means of the lines 33, 35.

A control 54 is connected with an output of the DC—DC voltage transformer 53 by means of a line 55 and it is connected with the rectifier circuit 51 by means of another line 56 via the line 52. In addition, the control 54 is connected with the sensors 15, 16, 17, 18 and with the actuator 21 by means of the lines 34, 36. The control 54 is connected with a modulator/demodulator 58 by means of a plurality of lines 57, of which only one line 57 is shown in the figure as a representative of these lines. The control 54 and the modulator/demodulator 58 together form the modulator/demodulator unit 32.

The modulator/demodulator 58 is connected by means of two lines 31 with a coil 59 of the transmission head 29, which said coil 59 cooperates with a coil 60 of the transmission head 28, which said coil 60 is associated with it [said coil 59]. The coil 60 of the transmission head 28 is connected with the coil 43, 44 of the transmission head 23 by means of the lines 27. Associated with the coil 43, 44, the coil 39, 40 of the transmission head 22 is associated with a modulator/demodulator 61 by means of the lines 25. The modulator/demodulator 61 is connected with a control 63 by means of a plurality of lines 62, of which only a line 62 is shown in the figure for the sake of greater clarity. The modulator/demodulator 61 and the control 63 together form a modulator/demodulator unit 64. The control 63 is connected with the a.c. voltage source 48 by means of a line 65 and with a central control, which is not shown in the figure, by means of a line 66. Even though the modulator/demodulator units 32, 64 are always shown separated from the transmission heads 22, 29 in the figures, the circuits necessary herefor may also already be integrated in the transmission heads 22, 29.

The mode of action of the energy and information transmission device of the rotary table 10 will be explained in greater detail below on the basis of FIGS. 1 through 4. The components arranged on the pallet 13 are supplied with energy by means of the coils 38, 42 and 49, 50 of the transmission heads 22, 23, 28, 29. The coil 38 is supplied with an alternating voltage for this purpose from the a.c. voltage source 48 via the lines 24. The alternating current thus flowing through the coil 38 generates a magnetic field, which is inductively coupled with the coil 42. The alternating current generated inductively in the coil 42 of the transmission head 23 is sent by means of the lines 26 to the coil 49 of the transmission head 28, where it in turn generates an alternating electromagnetic field, which is coupled inductively with the coil 50 of the transmission head 29. The alternating current generated inductively in the coil 50 is sent via the lines 30 to the rectifier circuit 51.

The d.c. voltage rectified by the rectifier circuit 51 and, if necessary, smoothed with the use of means not shown in FIG. 4, is sent via the lines 52 to the DC—DC d.c. voltage transformer 53, which transforms this d.c. voltage into a d.c. voltage with the desired voltage value and sends it to the components on the pallet 13 via the lines 33, 35. At the same time, the DC—DC voltage transformer 53 also supplies the control 54 with the necessary operating voltage via the line 55. The modulator/demodulator 58 is supplied, for example, via one of the lines 57.

The control 54 additionally receives the voltage rectified by the rectifier circuit 51 via the line 56. The control determines from the value of this rectified voltage the state of the coupling of the coil 49 with the coil 50 and of the coupling of the coil 38 with the coil 42. A controlled variable is thus generated for the a.c. voltage source 48. Together with the sensor data, which the control 54 receives via the lines 34, 36, this controlled variable is transmitted via the lines 57 to the modulator/demodulator 58 and digitally coded by same. The values to be transmitted are coded binarily in frequencies for this purpose, and the assignment of the frequencies to the values zero and one is selectable at the modulator/demodulator 58, for example, by means of jumpers. The sensor data thus converted into a frequency signal and the controlled variable are sent to the coil 59 via the lines 31. The coil 59 generates from this a.c. voltage sent to it an electromagnetic field, which is coupled with the coil 60 of the transmission head 28. The voltage generated inductively in the coil 60 is in turn sent via the lines 27 to the coil 43, 44, where an electromagnetic field is generated. The electromagnetic field generated by the coil 43, 44 is inductively coupled with the coil 39, 40, where a corresponding voltage is induced and sent to the modulator/demodulator 61 by means of the lines 25.

The modulator/demodulator 61 has suitable filters in order to separate interfering signals from the useful signals. The signal thus filtered is first converted into so-called logic levels by means of a no-voltage compensation. For example, a comparison is performed for this purpose with a defined reference voltage in a comparator not shown in the figure. The signal thus processed is compared with a reference frequency by means of logical units, for example, so-called flip-flops. Distinction is made by comparison with this reference frequency whether the particular frequency signals received correspond to a zero or a one in a binary representation. The binary signal obtained is sent to the control 63 via the line 62 and evaluated there. The controlled variable determined by the control 54 by evaluating the voltage of the rectifier circuit 51, which voltage is received via the line 56, is converted into a corresponding control signal and sent via the line 65 to the a.c. voltage source 48, which will then perform the corresponding adjustment of the a.c. voltage sent to the coil 28 via the lines 24. This adjustment may consist, for example, of a change in the frequency of the a.c. voltage, the phase or the amplitude. The control 63 can also determine the current consumption or the power consumption of the a.c. voltage source 48 by means of one of the lines 65 and perform the adjustment depending on the result of this determination. The sensor signals obtained from the sensors 15, 16, 17, 18 by means of the lines 34, 36 are passed on by the control 63 via the line 66 to a central control, which controls the corresponding machining operations depending on these sensor signals.

In addition, control signals are transmitted via the line 66 to the control 63 to control the actuator 21. The control 63 controls via the line 62 the modulator/demodulator 61 for generating the voltage frequency-coded corresponding to the signals received to apply this alternating voltage to the coil 39, 40 via the lines 25. The signal is then transmitted inductively from the coil 39, 40 to the coil 43, 44 and from there to the coil 60 via the lines 27. A voltage corresponding to the signals is induced in the coil 59 by means of inductive coupling and passed on via the lines 31 to the modulator/demodulator 58. A logical level is generated there similarly to the way it happens in the modulator/demodulator 61 by means of a zero voltage compensation, the frequency signals thus generated are compared with a reference frequency and, depending on the result of the comparison with the reference frequency, a binary code is generated from the values zero and one corresponding to the result of the comparison. This binary code is sent via the lines 57 to the control 54, where the actuator 21 is actuated via the line 36 corresponding to the signals received.

Bidirectional signal transmission from the base 11 to the pallet 13 and vice versa is thus possible by means of inductive coupling via the transmission heads 22, 23 and 28, 29, and the energy needed on the pallet 13 is likewise transmitted to the pallet 13 via the transmission heads 22, 23 and 28, 29. Since the transmission heads 22, 23 and 28, 29 use the same air gap for the transmission of the energy and the information, the monitoring of the voltage arriving at the pallet 13 is informative of the state of the particular air gaps, so that control of the voltage source 48 makes possible the constant energy supply of the components on the pallet 13. At the same time, parasitic inductions can be compensated by monitoring the controlled variable.

Figure 5:
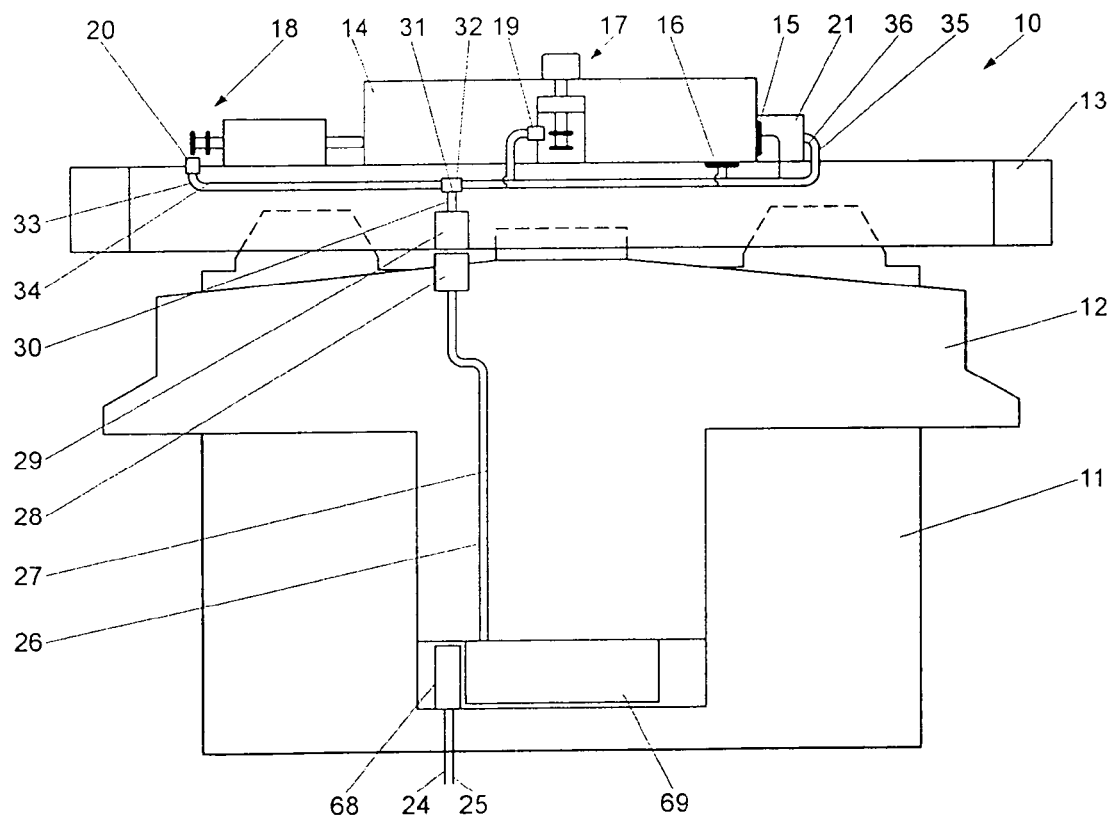
FIG. 5 is a schematic view of a rotary table as another exemplary embodiment having the features of the present invention.

FIG. 5 shows another exemplary embodiment of a rotary table 67 having the features of the present invention. Identical elements are designated by identical reference numbers. As can be determined from the figure, the rotary table 67 has transmission heads 68, 69 instead of the transmission heads 22, 23. The mode of action of the transmission heads 68, 69 corresponds to that of the transmission heads 22, 23, but the transmission heads 68, 69 are coupled with one another radially rather than axially as are the transmission heads 22, 23.

While specific embodiments of the invention have been shown and described in detail to illustrate the application of the principles of the invention, it will be understood that the invention may be embodied otherwise without departing from such principles.

What is claimed is:

1. A device for positioning a workpiece for machining, the device comprising:
    a base;
    a bench mounted movably at said base, the workpiece being fastenable to said bench;
    a detection means arranged at said bench for detecting a state of a machining process of said workpiece and for generating detected information depending thereon;
    a control associated with said base;
    an energy transmission means for transmitting electric energy to said components arranged on said bench;
    an information transmission means for transmitting detected information of said detection means to said control, said energy transmission means transmitting energy and said information transmission means transmitting information inductively and/or capacitively via a same air gap; and
    an additional detection means for detecting a state of energy transmission and for generating additional detected information depending thereon, said additional detected information being transmitted as feedback information to said control for correcting disturbances and/or changes in said energy transmission means and/or of said information transmission means.

2. A device in accordance with claim 1, wherein a common transmission head is used for said energy transmission means and for said information transmission means.

3. A device in accordance with claim 2, wherein said transmission head has a core, on which an energy transmission coil and an information transmission coil with mutually different magnetic field orientations are arranged.

4. A device in accordance with claim 2, wherein said transmission head is for radial or axial coupling.

5. A device in accordance with claim 1, wherein said additional detection means is associated with said bench and detects a transmitted voltage.

6. A device in accordance with claim 1, wherein said additional detection means is associated with said base and detects a current or a power consumption or a supply device for said energy transmission means.

7. A device in accordance with claim 1, wherein said additional detection means detects the temperature of an electric circuit associated with said bench or said base.

8. A device in accordance with claim 1, wherein an energy supply source for said components arranged on said bench is controlled by controlling a frequency of the voltage fed to said energy transmission means by pulse width modulation.

9. A device in accordance with claim 1, wherein the information transmission takes place digitally and binarily.

10. A device in accordance with claim 9, wherein the information transmission includes a frequency coding of the digital values and/or of the binary values.

11. A device in accordance with claim 10, wherein a frequency assignment is selected by means of jumpers.

12. A device in accordance with claim 9, further comprising a demodulation means for decoding the transmitted information, said demodulation means having logical units for the decoding.

13. A device in accordance with claim 9, wherein a decoding takes place by means of phase detection.

14. A device in accordance with claim 1, wherein said information transmission means is bidirectional.

15. A device in accordance with claim 1, further comprising a carrier fastenable to said bench for receiving said workpiece, to said detection means and/or to said components wherein said energy transmission means and/or said information transmission means transmit the energy and/or the information inductively and/or capacitively between said bench and said carrier.

* * * * *